Patented Aug. 24, 1937

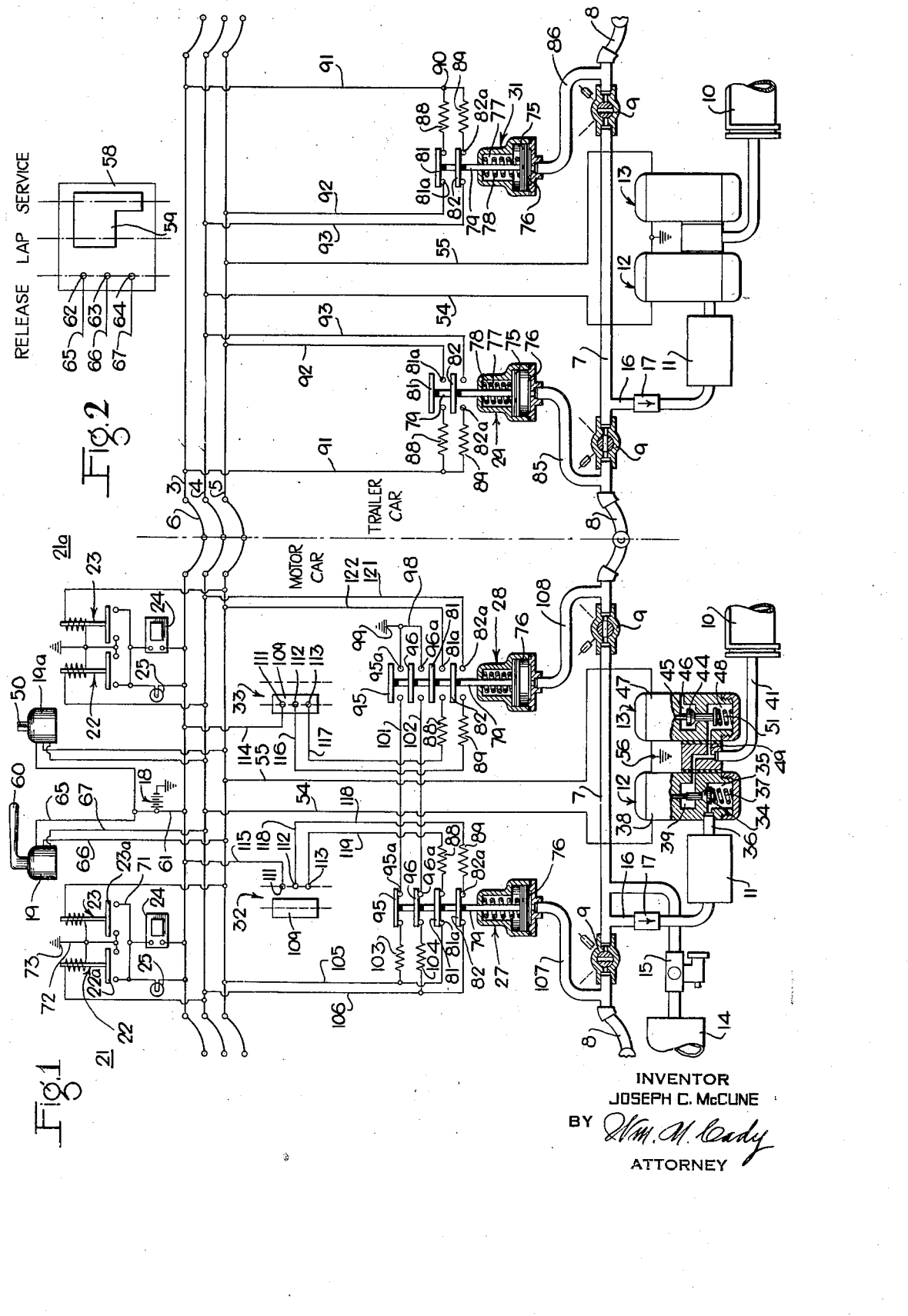

2,091,007

UNITED STATES PATENT OFFICE 2,091,007

BRAKE CONTROL CHECKING MEANS

Joseph C. McCune, Edgewood, Pa., assignor to The Westinghouse Air Brake Company, Wilmerding, Pa., a corporation of Pennsylvania Application June 2, 1936, Serial No. 83,010

18 Claims. (Cl. 303—20)

This invention relates to brake control checking means, that is, to means for checking or verifying the integrity of the brake control circuits for vehicles such as railway trains.

My present invention is applicable to electrically controlled brake systems similar to that shown and described in Patent No. 2,058,008, of Clyde C. Farmer, and assigned to the assignee of the present application, in which patent the brake controlling electromagnets on the cars of the train are operatively unresponsive to a normal low checking current in the control circuit wires extending throughout the length of the train.

In the above-mentioned patent it is necessary that the last car of the train always be one which is specially equipped with mechanism operatively responsive to the normal low checking current in the control circuit. Furthermore, unless the last car, which is specially equipped, accompanies the locomotive or motor car, the system for checking the integrity of the brake control circuit is inoperative.

It is accordingly an object of my invention to obviate the practical difficulties involved in a system such as disclosed in the above copending application, and to provide a relatively simple system for checking the integrity of the brake control circuits, in which system the locomotive or motor car may travel alone with no trailer car and in which any trailer car may be the last car in the train, without interfering with the effectiveness or operativeness of the system for checking the integrity of the brake control circuit.

The above and other more specific objects of my invention which will be made apparent hereinafter are attained by an illustrative embodiment of my invention subsequently to be described and shown in the accompanying drawing wherein, Fig. 1 is a simplified diagrammatic view, showing the essential elements of an electrically controlled brake system embodying my invention, and Fig. 2 is a diagrammatic view, indicating the circuit connections established in the various operating positions of either of the brake control switches shown in Fig. 1.

Referring to Fig. 1 of the drawing, the equipment to the left of the central broken line is carried on the motor car while the equipment to the right of the central broken line is illustrative of the equipment carried on each of the trailer cars, only the equipment for one trailer car being shown since the equipment for other trailer cars is merely a repetition of that shown in Fig. 1.

The equipment shown in Fig. 1 comprises a plurality of train wires 3, 4 and 5, hereinafter designated the supply wire, the application wire and the release wire respectively, the sections of the train wires carried on the motor car and on a trailer car being suitably connected in a well known manner by connectors such as indicated at 6.

The equipment also comprises a control pipe 7, which may be the usual brake pipe, extending throughout the length of the train, the adjacent ends of the sections of the brake pipe carried on successive trailer cars being connected by suitable flexible hose couplings 8 of well known construction, the opposite ends of the sections of the brake pipe on the cars being provided in customary manner with suitable angle cocks or valves 9 for opening or closing the brake pipe.

The motor car and each of the trailer cars are severally provided with a brake cylinder 10 and a local reservoir 11, an application magnet valve device 12 and a release magnet valve device 13 being provided for controlling the supply of fluid under pressure from the local reservoir 11 to the brake cylinder 10 and for releasing fluid under pressure from the brake cylinder.

A main reservoir 14 is carried on the motor car, which reservoir is charged with fluid under pressure in the usual manner from a compressor not shown, the main reservoir being connected to the brake pipe 7 through a pressure regulating or feed valve device 15 of well known construction.

The local reservoirs 11 are charged with fluid under pressure from the brake pipe 7, through a branch pipe 16 having a check valve 17 therein for preventing back flow of fluid under pressure from the local reservoirs to the brake pipe.

The equipment carried on the motor car further comprises a suitable source of current, such as indicated by the battery 18, a brake switch 19 located at one end hereinafter designated the head end of the motor car, a similar brake switch 19a located at the opposite end hereinafter designated the rear end of the motor car, a signal equipment 21 located at the head end of the motor car, and a signal equipment 21a located at the rear end of the motor car. The signal equipments 21 and 21a are identical in construction and each comprises a pair of relays 22 and 23, an audible signal device, such as an annunciator 24, and a visible signal device, such as the signal lamp 25.

According to my invention, I further provide a pair of pneumatic switch devices 27 and 28, which are of identical construction and which are located, respectively, at head and rear ends of the motor car, and a pair of control switches 32 and 33 located, respectively, at head and rear ends of the motor car. I also further provide a pair of pneumatic switch devices 29 and 31 which are of identical construction and which are located, respectively, at opposite ends of each of the trailer cars.

Referring in further detail to Fig. 1, each of the magnet valve devices 12 comprises a casing having an application valve 34 contained in a chamber 35 which is in constant communication with the local reservoir 11 through a pipe 36, and an electromagnet 38 effective, when energized, to so actuate the valve 34 as to unseat it from its associated valve seat against the force of a biasing spring 37 to open communication between the chamber 35 and a chamber 39 which is in constant communication with the brake cylinder 10 through a passage and pipe 41.

Each of the release magnet valve devices 13 comprises a casing having a release valve 44 contained in a chamber 45 which is constantly open to atmosphere through a port 46, and an electromagnet 47 effective, when energized, to actuate the valve 44 into seated relation on an associated valve seat to close communication between chamber 45 and a chamber 48 which is connected to the passage and pipe 41 leading to the brake cylinder 10 by a branch passage 49. When the electromagnet 47 is deenergized, the biasing spring 51 acting on the end of the fluted stem of the valve 44 yieldingly unseats the valve 44 to open communication between the brake cylinder pipe 41 through chamber 48 to the atmospheric chamber 45.

One terminal of the electromagnet 38 of each application magnet valve device 12 is connected by a wire 54 to the application wire 4 and one terminal of the electromagnet 47 of each release magnet valve device 13 is connected by a wire 55 to the release wire 5, the remaining terminals of the electromagnet windings 38 and 47 being both connected to the negative terminal of the battery 18, as through a ground connection at 56.

The brake switches 19 and 19a are identical in construction and, as indicated diagrammatically in Fig. 2, may comprise a rotary drum 58 having thereon in insulated relation a stepped contact segment 59 and a plurality of stationary contact members 62, 63 and 64 which are connected by wires 65, 66 and 67, respectively, to the positive terminal of battery 18, the release wire 5, and the application wire 4, respectively.

In the release position of the brake switch 19 or 19a the rotary drum is in such a position that the contact segment 59 does not engage any of the contact members 62, 63 and 64. When the rotary drum 58 is operatively rotated by means of the removable handle 60, to service application position, contact segment 59 engages and connects together all of the contact members 62, 63 and 64 to establish circuits for energizing all the application magnet valve devices 12 and all the release magnet valve devices 13, the circuits being traced hereinafter in detail.

In the lap position of the brake switches 19 and 19a, the rotary drum 58 is so positioned that the contact segment 59 connects only the contact members 62 and 63, thereby establishing circuits for energizing only the release magnet valve devices 13, the circuits being hereinafter traced in detail.

As shown in Fig. 1, only one removable handle 60 is provided, the handle being used for operating either the brake switch device 19 or the brake switch device 19a. The casing of the brake switch devices 19 and 19a is adapted to cooperate with the handle 60 in such manner as to prevent removal of the handle 60 from the operating shaft 50 of the rotary drum 58 except when the rotary drum 58 is in the release position.

The signal equipments 21 and 21a located at opposite ends of the motor car are not only identical in construction but are connected to the train wires 3, 4 and 5 in identically the same manner. Only the connections for the signal equipment 21 will, therefore, be described in detail but it will be understood that the signal equipment 21a is likewise similarly connected.

The annunciator 24 and the signal lamp 25 of the signal equipment 21 are connected in parallel relation between the supply wire 3 and a wire 71 which is connected to one of the stationary contact members of each of the relays 22 and 23, the other stationary contact members of each of the relays 22 and 23 being connected by a common wire 72 to the negative terminal of the battery 18, as through a ground connection 73. The movable contact members 22a and 23a of the relays 22 and 23, respectively, are normally actuated out of engagement with the stationary contact members of the corresponding relays due to the energization of the electromagnet winding of the relay. The winding of the relay 22 is constantly connected between the application wire 4 and the negative terminal of the battery 18 at the ground connection 73. The winding of the relay 23 is constantly connected between the release wire 5 and the negative terminal of the battery 18 at the ground connection 73.

The windings of the relays 22 and 23 are so designed as to cause actuation of the movable contact members thereof out of engagement with the stationary contact members thereof when energized by a relatively low current which is insufficient to actuatively energize the electromagnets of the magnet valve devices 12 and 13 for controlling the brakes. When either of the relays 22 or 23 is deenergized, the corresponding movable contact members 22a or 23a drop into contact with stationary contact members of the relay to establish the connection between the wire 71 and the ground wire 72 to thereby effect operation of the annunciator 24 and illumination of the signal lamp 25.

As will be hereinafter clearly described, the circuits for energizing the relays 22 and 23 of the signal equipments 21 and 21a may be completed under the control of any of the pneumatic switch devices 27, 28, 29 and 31.

The pneumatic switch devices 29 and 31 on the trailer cars are of any suitable construction and may comprise a casing containing a piston 75 having a chamber 76 at one side thereof for receiving fluid under pressure and a chamber 77 at the opposite side containing a biasing spring 78 yieldingly urging the piston 75 in opposition to the force of the fluid pressure in the chamber 76, the piston 75 having a stem 79 carrying a pair of insulated contact members 81 and 82 for cooperating respectively with a pair of stationary contact members 81a and a pair of stationary contact members 82a. When fluid under pressure is supplied to chamber 76, the piston is actuated against the force of the spring 78 to effect separation of the contact members 81 and 82 from their respectively associated contact members 81a and 82a.

Chamber 76 of the pneumatic switch device 29 is connected to the brake pipe 7 by a branch pipe 85 which opens into the brake pipe at a point between the angle cock 9 and the hose coupling 8 at one end of the trailer car. In a similar manner chamber 76 of the pneumatic switch device 31 is connected to the brake pipe 7 by a branch pipe 86 which opens into the brake pipe at a point between the angle cock 9 and hose coupling 8 at the opposite end of the trailer car.

As is well known, the angle cock at the rear end of the last car in the train is always in closed position, to close the end of the brake pipe 7, since the hose coupling 8 at the rear end of the last car in a train is vented to atmosphere. It will thus be seen that the chamber 76 of the pneumatic switch device 31 on the last trailer car is always vented to atmosphere. The contact members 81 and 82 of the pneumatic switch device 31 are accordingly actuated into circuit-closing position in engagement with their associated contact members 81a and 82a respectively.

Associated with each of the pneumatic switch devices 29 is a pair of resistors 88 and 89 and associated with each of the pneumatic switch devices 31 is a similar pair of resistors 88 and 89. The resistors of each pair have one end thereof connected by a wire 91 to the supply wire 3, the opposite end of the resistor 88 being connected to one of the contact members 81a of the associated pneumatic switch device, and the other end of the resistor 89 being connected to one of the contact members 82a of the associated pneumatic switch device. The remaining contact members 81a and 82a of the pneumatic switch devices 29 and 31 are each connected by wires 92 and 93, respectively, to the release wire 5 and to the application wire 4, respectively.

It will thus be seen that when the chamber 76 of either of the pneumatic switch devices 29 and 31 is vented to atmosphere, the supply wire 3 is connected to the application wire 4 through resistor 89 and also connected to the release wire 5 through the resistor 88.

The resistors 88 and 89 are so designed as to limit the normal or checking current flowing through the application and release wires 4 and 5 to a relatively low value which is effective to cause pick-up of the relays 22 and 23 of the signal equipments 21 and 21a, but which is insufficient to actuatively energize the electromagnets 38 and 47 of the magnet valve devices 12 and 13 on the motor car and trailer cars.

The pneumatic switches 27 and 28 on the motor car are substantially similar to the pneumatic switches 29 and 31 and differ therefrom in that the piston stem 79 thereof carries in insulated relation thereon an additional pair of contact members 95 and 96 which are actuated out of contact with associated pairs of stationary contact members 95a and 96a, respectively, when fluid under pressure is supplied to the chamber 76 thereof and which are actuated into circuit-closing relation in contact with the associated contact members 95a and 96a when fluid under pressure is vented from the chamber 76. One of the contact members 95a and one of the contact members 96a of pneumatic switch device 28 are connected by a wire 98, which is connected to the negative terminal of the battery 18, as by connection to ground at 99. The other contact members 95a and 96a of the pneumatic switch 28 are connected by wires 101 and 102, respectively, to one contact member 95a and one contact member 96a of the pneumatic switch 27, respectively. The other contact members 95a and 96a of the pneumatic switch 27 are connected, respectively, to one end of a resistor 103 and one end of a resistor 104, respectively, the opposite ends of the resistors 103 and 104 being connected by wires 105 and 106, respectively, to the release wire 5 and the application wire 4, respectively.

The chamber 76 of the pneumatic switch device 27 is connected by a branch pipe 107 to the brake pipe 7 at a point between the angle cock 9 and the hose coupling 8 at the head end of the motor car, while the chamber 76 of the pneumatic switch device 28 is connected by a branch pipe 108 to the brake pipe 7 at a point between the angle cock 9 and the flexible hose coupling 8 at the rear end of the motor car. The angle cock 9 at the head end of the motor car is in closed position in order to close the brake pipe 7 at the head end of the train while the angle cock 9 at the rear end of the motor car is in open position normally when the motor car hauls one or more trailer cars. Consequently, the chamber 76 of the pneumatic switch device 27 is vented to atmosphere and the chamber 76 of the pneumatic switch device 28 is normally charged with fluid under pressure from the brake pipe 7.

It will thus be seen that as long as a trailer car is coupled to the motor car, the pneumatic switch device 28 will be actuated so that the contact members 95 and 96 are in circuit-opening position. However if the motor car travels alone, without any trailer car coupled thereto, the chamber 76 of the pneumatic switch device 28 will be vented to atmosphere the same as the chamber 76 of the pneumatic switch 27, since the angle cock 9 at the rear end of the motor car will be then closed and the flexible hose coupling 8 open to atmosphere.

The resistors 103 and 104 are thus connected across or between the release wire 5 and the application wire 4, respectively, and the negative terminal of the battery 18 at the ground connection 99 only when the motor car is operating alone, the resistors 103 and 104 thereby serving to simulate or take the place of the electromagnets of the magnet valve devices 12 and 13 on trailer cars so as to prevent excessive current being supplied to the magnet valve devices 12 and 13 on the motor car by operation of the brake switch devices 19 or 19a.

The control switches 32 and 33 are provided for selectively connecting the resistors 88 and 89, associated respectively with the pneumatic switch devices 27 and 28, between the supply wire 3 and the release and application wires 5 and 4 respectively. It will be apparent that when the motor car is operating alone without any trailer car, the normal low checking current in the train wires 4 and 5 must traverse the entire length of the motor car in order to serve as a check on the integrity of those wires. The function of the control switch 33 is, therefore, to connect the resistors 88 and 89, associated with the pneumatic switch device 28, in the circuit between the supply wire 3 and the release and application wires 5 and 4, respectively, when the motor car is being operated from the head end of the car having the brake switch device 19 and the signal equipment 21. The control switch 32 is provided for closing the circuit connection from the supply wire 3 through the resistors 88 and 89, associated with the pneumatic switch device 27, to the release and application wires 5 and 4, respectively, only when the motor car is operated from the rear end of the car having the brake switch device 19a and the signal equipment 21a.

The control switches 32 and 33 may be of any suitable construction and are illustrated diagrammatically as comprising a movable contact segment 109 and a plurality of stationary contact members 111, 112 and 113.

The contact members 111 of the control switches 32 and 33 are connected by wires 115 and 114, respectively, to the supply wire 3. The contact members 112 and 113 of the control switch 33 are connected by wires 116 and 117, respectively, to corresponding terminals of the resistors 89 and 88 respectively, associated with the pneumatic switch device 28. In a similar manner, the contact members 112 and 113 of the control switch 32 are connected by wires 118 and 119, respectively, to corresponding terminals of the resistors 89 and 88 associated with the pneumatic switch device 27.

The control switches 32 and 33 may be of individual construction adapted for manual operation but it is preferable that they be associated with some operating device on the motor car such as the reverser switch associated with the motor controller at each end of the motor car, respectively, or with the brake switch devices 19 or 19a, in order to insure the proper conditioning thereof automatically.

As is well known, only one handle is provided for operating the reverser switch associated with the motor controller at one end of the motor car and the reverser switch associated with the motor controller at the opposite end of the motor car and that upon removal of the reverser switch handle, the reverser switch is automatically conditioned in a handle-off or neutral position. The contact member 109 of the control switches 32 and 33 may, therefore, be carried on the control drum of the reverser switch in such position that when the handle of the reverser switch is removed, the contact member 109 connects the contact members 111, 112 and 113 and that when the reverser switch is operated either into forward or reverse position, the contact segment 109 disengages the contact members 111, 112 and 113. Thus the control switch 32 or 33, at the end of the car opposite to that at which the operator is stationed and from which the motor car is being driven, will automatically be in the closed position, while the control switch 32 or 33 at the end of the car where the operator is stationed and from which the motor car is being operated is automatically in circuit-opening position.

*Operation*

Assuming a train of cars including the motor car and one or more trailer cars coupled to the motor car, the equipment is charged initially by fluid under pressure from the main reservoir 14 carried on the motor car, fluid under pressure being supplied at a pressure as regulated by the feed valve device 15 into the brake pipe 7 to charge the local reservoirs 11 on the motor car and on the trailer cars. It will be understood that the angle cocks 9 at the head and rear end, respectively, of the train are closed, whereas the angle cocks 9 intermediate thereof are opened in order to permit the flow of fluid under pressure through the brake pipe 7. As a result, the pneumatic switch device 27 at the head end of the motor car is actuated to circuit-closing position, since the chamber 76 thereof is vented to atmosphere, and the pneumatic switch device 31 at the rear end of the last trailer car is likewise actuated to circuit-closing position, due to the venting of fluid under pressure from its chamber 76. The pneumatic switch devices 28 and 29, representative of all pneumatic switch devices intermediate of the pneumatic switch devices 27 and 31, are actuated to circuit-opening position due to the supply of fluid under pressure from the brake pipe 7 to the chambers 76 thereof.

The pneumatic switch device 31 accordingly establishes checking circuits whereby the relays 22 and 23 of the signaling equipments 21 and 21a are energized. The circuit for energizing the relay 22 of signaling equipment 21 extends from the positive terminal of the battery 18 through a wire 61 to the supply wire 3 and thence to the last trailer car, then through wire 91 to the point 90 whence the circuit divides, one part extending through resistor 89, contact members 82 and 82a of the pneumatic switch 31, wire 93, application wire 4 back to the motor car, and through the winding of the relay 22 and the ground connection 73 to the negative terminal of the battery 18, the other part extending from the point 90 through resistor 88, contact members 81 and 81a of the pneumatic switch device 31, wire 92, release wire 5 back to the motor car, and thence through the winding of the relay 23 and the ground connection 73 to the negative terminal of the battery 18.

While the electromagnets of magnet valve devices 12 and 13 are connected in parallel with the relays 22 and 23, they are not operatively energized by the low checking current flowing through the circuits just traced. However, the relays 22 and 23 of the signaling equipment 21 and also of the signaling equipment 21a are energized to separate the contact members 22a and 23a thereof from the stationary contact members associated therewith.

If, therefore, with checking circuits just described established, the train wires 3, 4 and 5 are unbroken, the relays 22 and 23 are picked up and as a result the annunciator 24 is silent and the signal lamp 25 is not illuminated.

Assuming a train comprising the motor car and one or more trailer cars to be traveling along the road, the equipment being conditioned as shown in Fig. 1 with the brake switch 19 in release position under the control of the operator, a service application of the brakes is initiated by the operator turning the handle 60 on the brake switch 19 to service application position wherein the contact segment 59 of the brake switch connects the contact members 62, 63 and 64. Circuits are accordingly established for energizing the application magnet valve devices 12 and the release magnet valve devices 13 on the motor car and on the trailer car. The circuits for energizing the application magnet valve devices 12 extends from the positive terminal of the battery 18 through the wires 61 and 65, contact member 62, contact segment 59 and contact member 64 of the brake switch 19, wire 67, application wire 4, and thence in parallel through all of the electromagnet windings 38 of the magnet valve devices 12 to the ground connection and thus to the negative terminal of battery 18.

The circuit for energizing the release magnet valve devices 13 extends from the positive terminal of the battery 18 to the contact segment 59 of the brake switch 19 as previously traced for the magnet valve devices 12, and thence through the contact member 63, wire 66 and release wire 5, and in parallel through the electromagnets 47 of all the release magnet valve devices 13 to the ground connection and thus to the negative terminal of battery 18.

The release valve 44 of each of the release magnet valve devices 13 is accordingly actuated to seated position to close off the exhaust communication from the brake cylinder 10 to atmosphere, and each of the application valves 34 is unseated to open communication for the supply of fluid under pressure from the corresponding local reservoir 11 to the associated brake cylinder 10 through pipe 36, chamber 35 of the application magnet valve device 12, past the unseated valve 34, through chamber 39 and passage and pipe 41. The brakes are thus simultaneously applied on the motor car and on the trailer cars.

When a desired degree of application of the brakes is attained the operator turns the handle 60 of the brake switch 19 to the lap position thereof, wherein the connection between the contact segment 59 and contact member 64 is broken and wherein only the contact members 62 and 63 are connected by the contact segment 59. The circuit previously traced, for energizing the electromagnet winding 38 of each magnet valve device 12 is accordingly interrupted while the circuit for energizing the electromagnet winding 47 of each release magnet valve device 13 is maintained. The application valve 34 of each application magnet valve device 12 is thus actuated to seated position to close off the further supply of fluid under pressure to the corresponding brake cylinder 10 and the release valve 44 of each release magnet valve device 13 remains in seated position to prevent the loss of fluid under pressure from the brake cylinder so that the brake continues to be applied according to the degree of attaining brake cylinder pressure.

If it is desired to increase the degree of braking effect, the operator returns the brake switch handle 60 to service position wherein the magnet valve devices 12 are again energized to supply more fluid under pressure from the reservoirs 11 to the brake cylinders 10. When the higher degree of braking effect is attained, the operator again returns the brake switch handle 60 to lap position to hold the brakes applied according to the degree of brake cylinder pressure attained.

A full service application of the brakes is effected when the pressure of each brake cylinder 10 equalizes with the pressure in the corresponding local reservoir 11.

If the operator desires to reduce the degree of braking, following a service application initiated as just described, he operates the brake switch handle 60 from the lap position to the release position, holds it there long enough to reduce the brake cylinder pressure 10 to the desired degree and then returns the handle to lap position. In the release position of the brake switch the application magnet valve devices 12 and release magnet valve devices 13 are all deenergized and consequently the application valves 34 are actuated to close off the supply of fluid under pressure to the reservoirs 11 to the brake cylinders 10 while the release valves 44 are unseated to exhaust fluid under pressure from the brake cylinders through the communication established by way of pipe and passage 41, branch pipe 49, chamber 48, past the unseated release valve 44, chamber 45 and exhaust port 46.

When the brake switch handle 60 is returned to lap position the release magnet valve devices 13 are again energized as previously described so that the release valves 44 are actuated to seated position to close off the further exhaust of fluid under pressure from the brake cylinders 10. The brake cylinder pressure may be reduced in any number of desired steps by repeating the operation of the brake switch handle 60 from lap position to release position and back to lap position again.

The brakes may be fully released by operating the brake switch handle 60 to release position and allowing it to remain there so that the fluid under pressure is fully exhausted from the brake cylinders 10.

*Checking circuit for motor car and trailer cars*

If, with the equipment conditioned as shown in Fig. 1, any of the train wires 3, 4 and 5 should be broken, the circuit previously traced for either one or both of the relays 22 and 23 in the signal equipments 21 and 21a will be interrupted and thus movable contact member 22a or 23a drops into circuit-closing position to complete the circuit for energizing the signal lamp 25 and the annunciator 24 to indicate that there is a break in the control circuit and that the electrically controlled brake cannot be relied upon.

It will be observed that the pneumatic switch device 31 at the rear end of the last trailer car is automatically conditioned to complete the checking circuit when other trailer cars in the rear of a particular trailer car are uncoupled therefrom. It will be understood that according to customary practice, the angle cock 9 at the rear end of the last car of the train is always operated to closed position before uncoupling the flexible hose coupling 8, in order to prevent the loss of pressure in the brake pipe 7. Thus, the pneumatic switch device, exemplified by pneumatic switch device 31, is automatically conditioned to complete the checking circuit at the rear end of the last trailer car.

It will, therefore, be seen that without regard to the number of trailer cars and without regard to which of the trailer cars is last in the train the checking circuits are always effective.

*Checking circuit for motor car alone*

Assuming that the motor car is traveling alone, that is without any trailer cars coupled thereto, and that the operator is stationed at the head end of the motor car at which the brake switch 19 and signaling equipment 21 is located, the checking circuits are maintained through the pneumatic switch device 28, which is actuated to circuit-closing position since it is the last pneumatic switch device at the rear of the brake pipe 7.

Since the operator is stationed at the end of the motor car opposite to that at which the control switch 33 is located, the control switch 33 is in circuit-closing position connecting the contact members 111, 112 and 113. The checking circuits for maintaining the signal relays 22 and 23 energized are accordingly established. The circuit for the relay 22 of the signal equipment 21 extends from the positive terminal of the battery 18 through wire 61 and the supply wire 3, wire 114, contact member 111 of the control switch 33, contact segment 109, contact member 112, wire 116, resistor 89, contact members 82a and 82 of pneumatic switch device 28, the wire 121, application wire 4, and through the winding of the relay 22 to the ground connection 73 and thus to the negative grounded terminal of battery 18.

The circuit for energizing the winding of the relay 23 extends from the positive terminal of the battery 18 to the contact segment 109 of the control switch 33 in the manner just traced for the relay 22, and thence through contact member 113, wire 117, resistor 88, contact members 81a and 81 of the pneumatic switch device 28, wire 122, release wire 5 and thence through the winding of the relay 23 to the ground connection 73 and through ground to the negative terminal of battery 18.

Both relays 22 and 23 are accordingly energized by the normal low checking current which traverses the entire length of the application and release wires carried on the motor car. In the event of the train wires 3, 4 and 5 carried on the motor car being broken either one or both of the relays 22 and 23 will be deenergized and the circuit thereby completed for energizing the annunciator 24 and the signal lamp 25.

Should the operator be stationed at the rear end of the car at which the brake switch 19a and the signaling equipment 21a is located, as when the motor car is driven from the rear end, the control switch 32 will be in closed position connecting the contact members 111, 112 and 113 thereof, whereas the control switch 33 will be in open position wherein the contact members 111, 112 and 113 thereof are disconnected.

The checking circuit for the relay 22 of signal equipment 21a is then established from the positive terminal of the battery 18 through wire 61 and supply wire 3, wire 115, contact member 111, contact segment 109 and contact member 112 of the control switch 32, wire 118, resistor 89 associated with the pneumatic switch device 27, contact members 82a and 82 of the pneumatic switch device 27, wire 103, application wire 4 and through the winding of the relay 22 to the ground connection.

The circuit for energizing the relay 23 of signal equipment 21a extends from the positive terminal of the battery 18 to the contact segment 109 of the control switch 32 in the manner previously traced for the relay 22, and thence through the contact member 113 of the control switch 32, wire 119, resistor 88 associated with the pneumatic switch device 27, contact members 81a and 81 of the pneumatic switch device 27, wire 105, release wire 5, and through the winding of the relay 23 to the ground connection. Thus the checking current flows through the entire length of the application and release wires 4 and 5 carried on the motor car and in the event of the application or release wires becoming broken at any point along the length thereof either of the relays 22 or 23 respectively will become deenergized to complete the circuit for energizing the annunciator 24 of the signal lamp 25 of the signal equipment 21a.

It will be appreciated that due to the absence of trailer cars and the accompanying current load of the electromagnet valve devices 12 and 13 on the trailer cars, the current supplied to energize the magnet valve devices 12 and 13 on the motor car under the control of the brake switch devices 19 and 19a when the motor car is operating or traveling alone may be excessive and thereby tend to cause overheating and even possibly burning out the electromagnet windings of the magnet valve devices 12 and 13 on the motor car. I, therefore, provide the resistors 103 and 104 to simulate the current load effect of the magnet valve devices 12 and 13 on the trailer cars and limit the energizing current for the magnet valve devices 12 and 13 on the motor car, supplied under the control of the brake switch devices 19 and 19a, to a safe maximum value.

It will be seen that when the motor car is operating alone without any trailer cars coupled thereto, both the pneumatic switch device 27 and the pneumatic switch device 28 are actuated to circuit-closing position to connect the resistor 104 in parallel with the electromagnet winding 38 of the magnet valve device 12 from the application wire 4 through the wire 106, resistor 104, contact members 96a and 96 of the pneumatic switch device 27, wire 102, contact members 96a and 96 of the pneumatic switch device 28, wire 98 to the ground connection 99, the resistor 103 being simultaneously connected in parallel relation with the electromagnet winding 47 of the release magnet valve device 13 from the release wire 5 through wire 105, the resistor 103, contact members 95a and 95 of the pneumatic switch device 27, wire 101, contact members 95 and 95a of the pneumatic switch device 28, and wire 98 to the ground connection 99.

*Summary*

Summarizing, it will be seen that I have provided a simple and effective system for checking or verifying the integrity of the brake control circuits, regardless of the number of the cars in the train and without requiring any particular car to be the last car of a train. The system which I have devised is further adapted to be effective, even when the locomotive or motor car is operating or traveling alone with no trailer cars coupled thereto.

While I have shown and described only one embodiment of my invention, it will be apparent that various omissions, additions or modifications may be made in the embodiment shown, without departing from the spirit of my invention. It is not my intention therefore to limit the scope of my invention except as necessitated by the scope of the prior art.

Having now described my invention, what I claim as new and desire to secure by Letters Patent, is:

1. In an electrically controlled brake system for a train of cars, in combination, a normally open brake control circuit, a normally closed checking circuit including a portion of said brake control circuit, means on each car of the train operative to complete the checking circuit, and means for so controlling said last means as to cause only the means on the last car of the train to be operated to complete the checking circuit.

2. In an electrically controlled brake system for a train of cars, in combination, a normally open brake control circuit, a normally closed checking circuit including a portion of said brake control circuit, means on each car of the train operative to complete the checking circuit, and means effective to prevent all of said last means except that on the last car of the train from being operated to complete the checking circuit.

3. In an electrically controlled brake system for a train of cars, in combination, a normally open brake control circuit, a normally closed checking circuit including a portion of said brake control circuit, means on each car of the train operative to complete the checking circuit, and fluid pressure responsive means for controlling said last means.

4. In an electrically controlled brake system for a train of cars, in combination, a brake pipe normally charged with fluid under pressure, a normally open brake control circuit, a normally closed checking circuit including a portion of said brake control circuit, means on each car of the train operative to complete the checking circuit, and means controlled by brake pipe pressure and effective upon the separation of a car or cars from the rear end of a train to cause operation of the means on the resultant last car in the train to complete the checking circuit.

5. In an electrically controlled brake system for a train of cars, in combination, a brake pipe normally charged with fluid under pressure, a normally open brake control circuit including a plurality of train wires, a normally closed checking circuit including said train wires, means on each car operative to complete the checking circuit, and means controlled by brake pipe pressure for so controlling said last means as to cause only the means on the last car to be operated to complete the checking circuit.

6. In an electrically controlled brake system for a train of cars, in combination, a normally open brake control circuit, a normally closed checking circuit including a portion of said brake control circuit, means on each car operative to complete the checking circuit, a control pipe extending throughout the train and adapted to be sectionalized into different portions, and fluid pressure responsive means controlled according to the pressure in the various sectionalized portions of the control pipe for controlling the operation of said last means.

7. In an electrically controlled brake system for a train of cars, in combination, a normally open brake control circuit, a normally closed checking circuit including a portion of said brake control circuit, means on each car operative to complete the checking circuit, a control pipe extending throughout the train, a portion of which is normally charged with fluid under pressure and another portion from which fluid under pressure is normally discharged, and means responsive to the pressure in the said portions of the control pipe for causing only the means on the last car to be operated to complete the checking circuit.

8. In an electrically controlled brake system for a train of cars, a normally open brake control circuit, a normally closed checking circuit including a portion of the brake control circuit, a control pipe extending through the length of the train and normally charged with fluid under pressure, means on each car for segregating the end portion of the section of the control pipe carried on the car from the charged portion, the pressure in the segregated end portion on each car being reduced only when the segregated end portion is at the rear end of the control pipe, and fluid pressure responsive means on each car effective only when the end portion of the section of the control pipe on the car is segregated and the pressure therein reduced for completing the checking circuit.

9. In an electrically controlled brake system for a car or train of cars, in combination, a normally open brake control circuit including electroresponsive means effective only in response to a certain minimum current in said circuit to effect application of the brakes, a normally closed circuit including a portion of the normally open circuit and having a normal checking current therein which is less than said certain minimum current, means on each car adapted to limit the current in the normally closed checking circuit to less than said certain minimum current, and switch means on each car effective to complete the checking circuit and render the current limiting means thereon effective.

10. In an electrically controlled brake system for a car or train of cars, in combination, a normally open brake control circuit including electroresponsive means effective only in response to a certain minimum current in said circuit to effect application of the brakes, a normally closed circuit including a portion of the normally open circuit and having a normal checking current therein which is less than said certain minimum current, resistance means on each car adapted to limit the current in the normally closed checking circuit to less than the said certain minimum current, and switch means on each car effective to complete the checking circuit through the resistance means thereon.

11. In an electrically controlled brake system for a train of cars, in combination, a brake pipe extending throughout the train and normally charged with fluid under pressure, a normally open brake control circuit including a plurality of train wires, a normally closed checking circuit including said train wires, and separate switch means at opposite ends of each car operative to circuit-closing position to connect one of said train wires to the other train wires to complete the checking circuit, and fluid pressure responsive means for each switch means normally subject to the pressure in the brake pipe for maintaining the switch means in circuit-opening position and responsive to the reduction in pressure in the end section of the brake pipe when a car is uncoupled at the end of the train for operating the switch means.

12. In an electrically controlled brake for a car, in combination, a normally open brake control circuit including a plurality of train wires extending the length of the car, a normally closed checking circuit including said train wires, a plurality of signal means operating on said checking circuit and connected respectively to opposite ends of certain of the train wires, and switch means at opposite ends of the car adapted to connect one of the train wires to the said certain train wires to complete the checking circuit for the signal means at the opposite end of the car through the entire length of the certain train wires.

13. In an electrically controlled brake for a car, in combination, a normally open brake control circuit including a plurality of train wires extending the length of the car, a normally closed checking circuit including said train wires, a plurality of signal means operating on said checking circuit and connected respectively to opposite ends of certain of the train wires, switch means at opposite ends of the car adapted to connect one of the train wires to the said certain train wires to complete the checking circuit for the signal means at the opposite end of the car through the entire length of the certain train wires, and means for preventing the connection by said switch means of said one train wire to the other train wires at one end of the car unless the car operator controls the motion of the car from the opposite end of the car.

14. In an electrically controlled brake system for a motor car adapted to travel alone or with one or more trailer cars coupled thereto, in combination a normally open brake control circuit, electroresponsive means on the motor car operating on said circuit for controlling application and release of the brakes, and means effective only when the motor car travels alone for limiting the current supplied to the electroresponsive means.

15. In an electrically controlled brake system for a motor car adapted to travel alone or with one or more trailer cars coupled thereto, in combination a normally open brake control circuit, electroresponsive means on the motor car operating on said circuit for controlling application and release of the brakes, means adapted to limit the current supplied to the electroresponsive means, and means on the motor car effective only when the motor car travels alone for rendering the current limiting means effective.

16. In an electrically controlled brake system for a motor car adapted to travel alone or with one or more trailer cars coupled thereto, in combination a normally open brake control circuit, electroresponsive means on the motor car operating on said circuit for controlling application and release of the brakes, resistance means on the motor car adapted to be connected in said brake control circuit to limit the current supplied to the electroresponsive means, and switch means effective to connect said resistance means in said brake control circuit only when the motor car travels alone.

17. In an electropneumatic brake system for a motor car adapted to travel alone or with one or more trailer cars coupled thereto, in combination, a normally open brake control circuit for controlling application and release of the brakes on the motor car and on the trailer cars, a control pipe normally charged with fluid under pressure, and comprising separate sections on the motor car and on the trailer cars, the successive sections being connected when the cars having the sections are coupled, means for segregating the opposite end portions of the control pipe section on each car from the central portion of the section, the opposite end portions being vented to atmosphere when no other car is coupled to that end of the car having the control pipe section, means on the motor car for limiting the current in the brake control circuit, and two fluid pressure responsive means operatively responsive to the pressure in the one end portion and in the opposite end portion respectively of the control pipe section on the motor car and effective jointly only when the motor car has no cars coupled thereto for rendering the current limiting means effective.

18. In an electrically controlled brake system for a motor car adapted to travel alone or with one or more trailer cars coupled thereto, the combination including a brake control circuit, electroresponsive means on the motor car operating on said circuit for controlling application and release of the brakes, means effective to prevent energization of the said electroresponsive means to an abnormally high degree, and means effective only when the motor car travels alone for rendering said last means effective.

JOSEPH C. McCUNE.